(12) United States Patent
Youngers et al.

(10) Patent No.: US 9,574,613 B1
(45) Date of Patent: Feb. 21, 2017

(54) MACHINE LEVELING PEDESTAL

(71) Applicants: Stephen A. Youngers, Clearwater, KS (US); Neil J. Youngers, Viola, KS (US); James J. Youngers, Viola, KS (US); Patrick L. Emerson, Andover, KS (US); Stephen P. Dooley, Goddard, KS (US)

(72) Inventors: Stephen A. Youngers, Clearwater, KS (US); Neil J. Youngers, Viola, KS (US); James J. Youngers, Viola, KS (US); Patrick L. Emerson, Andover, KS (US); Stephen P. Dooley, Goddard, KS (US)

( * ) Notice: Subject to any disclaimer, the term of this patent is extended or adjusted under 35 U.S.C. 154(b) by 234 days.

(21) Appl. No.: 14/312,232

(22) Filed: Jun. 23, 2014

(51) Int. Cl.
| | |
|---|---|
| *B66F 1/06* | (2006.01) |
| *F16D 1/00* | (2006.01) |
| *B66F 1/00* | (2006.01) |
| *B66F 3/16* | (2006.01) |
| *B66F 1/02* | (2006.01) |
| *B66F 3/18* | (2006.01) |
| *B66F 7/08* | (2006.01) |

(Continued)

(52) U.S. Cl.
CPC . *F16D 1/00* (2013.01); *B66F 1/00* (2013.01); *B66F 1/025* (2013.01); *B66F 3/16* (2013.01); *B66F 3/18* (2013.01); *B66F 3/247* (2013.01); *B66F 3/38* (2013.01); *B66F 7/08* (2013.01); *B66F 7/16* (2013.01); *B66F 2700/05* (2013.01); *B66F 2700/055* (2013.01)

(58) Field of Classification Search
CPC .............. B66F 1/00; B66F 1/025; B66F 3/18; B66F 3/16; B66F 3/38; B66F 7/08; B66F 2700/05; B66F 2700/055; B66F 3/247; B66F 7/01; B66F 7/16

USPC ............ 254/93 A, 2 B, 93 R, 103, 100, 134; 74/665 A, 89.35, 72

See application file for complete search history.

(56) References Cited

U.S. PATENT DOCUMENTS

| 1,545,963 A | * | 7/1925 | Kopf ........................ B66F 3/14 254/103 |
| 2,510,285 A | | 6/1950 | Heyerman |

(Continued)

FOREIGN PATENT DOCUMENTS

| AU | WO 2014012148 A1 | * | 1/2014 | ............... B66F 3/10 |
| CN | 202880751 | * | 4/2013 | |

(Continued)

*Primary Examiner* — David M Fenstermacher
*Assistant Examiner* — Randell J Krug
(74) *Attorney, Agent, or Firm* — Kenneth H. Jack; Davis & Jack, L.L.C.

(57) ABSTRACT

A machine leveling pedestal incorporating a cylinder and piston defining an interior space, having a helically threaded outer surface, and having an upwardly facing land; a hydraulic fluid port opening the interior expansion space; a nut having a downwardly facing land and gear teeth, the nut being threadedly mounted over the helically threaded outer surface; a drive gear connected to the cylinder and piston for vertically slidably engaging the drive gear with the gear teeth, and, upon alternate rotations of the drive gear, rotating the nut about the cylinder and piston so that the nut vertically moves between a mechanical support position and a hydraulic support position, the upwardly and downwardly facing lands contacting each other upon movement to the mechanical support position, and the downwardly facing land displacing upwardly upon movement toward the hydraulic support position; and a motor connected to the drive gear.

9 Claims, 5 Drawing Sheets

(51) Int. Cl.
   *B66F 7/16*   (2006.01)
   *B66F 3/38*   (2006.01)
   *B66F 3/24*   (2006.01)

(56) References Cited

U.S. PATENT DOCUMENTS

| | | | |
|---|---|---|---|
| 3,072,209 A | | 1/1963 | Perry, Jr. |
| 3,135,165 A | * | 6/1964 | Ciallie ........................ B66F 3/18 |
| | | | 91/216 A |
| 3,236,489 A | * | 2/1966 | Mattocks ................... B63C 5/04 |
| | | | 254/103 |
| 3,309,062 A | * | 3/1967 | Jansz ........................ B66F 3/30 |
| | | | 254/93 VA |
| 3,321,182 A | | 5/1967 | Elenburg |
| 3,578,278 A | | 5/1971 | Pickering |
| 4,014,519 A | | 3/1977 | Leigh |
| 4,046,354 A | | 9/1977 | Stith, Jr. |
| 4,135,392 A | | 1/1979 | Young |
| 4,592,532 A | | 6/1986 | Stith, Jr. |
| 4,846,436 A | * | 7/1989 | Young ........................ F16M 7/00 |
| | | | 248/188.4 |
| 4,865,293 A | * | 9/1989 | Ishi ........................... B66F 3/24 |
| | | | 254/2 R |
| 4,930,741 A | * | 6/1990 | Young ........................ F16F 15/02 |
| | | | 248/542 |
| 5,188,379 A | | 2/1993 | Krause et al. |
| 5,577,703 A | | 11/1996 | Young |
| 5,797,227 A | | 8/1998 | Garza-Tamez |
| 6,299,137 B1 | | 10/2001 | Bainter |
| 6,895,648 B1 | | 5/2005 | Willett |
| 2001/0025951 A1 | | 10/2001 | Bainter |
| 2006/0260462 A1 | * | 11/2006 | Stanford ................... B66F 3/30 |
| | | | 92/15 |
| 2010/0032534 A1 | | 2/2010 | Cho |
| 2011/0024706 A1 | | 2/2011 | Schwindaman et al. |
| 2014/0083237 A1 | * | 3/2014 | Kim ........................... G05G 1/10 |
| | | | 74/501.6 |
| 2015/0076432 A1 | * | 3/2015 | Farquharson ............. B66F 3/24 |
| | | | 254/93 A |
| 2016/0075540 A1 | * | 3/2016 | Decker ...................... B66F 3/30 |
| | | | 254/93 A |

FOREIGN PATENT DOCUMENTS

| | | | | |
|---|---|---|---|---|
| CN | 203034829 U | * | 7/2013 | |
| IT | EP 0538208 A1 | * | 4/1993 | ............... B66F 3/10 |
| SU | 931698 A1 | * | 5/1982 | |
| WO | WO 2012088019 A1 | * | 6/2012 | ............... B66F 3/30 |

* cited by examiner

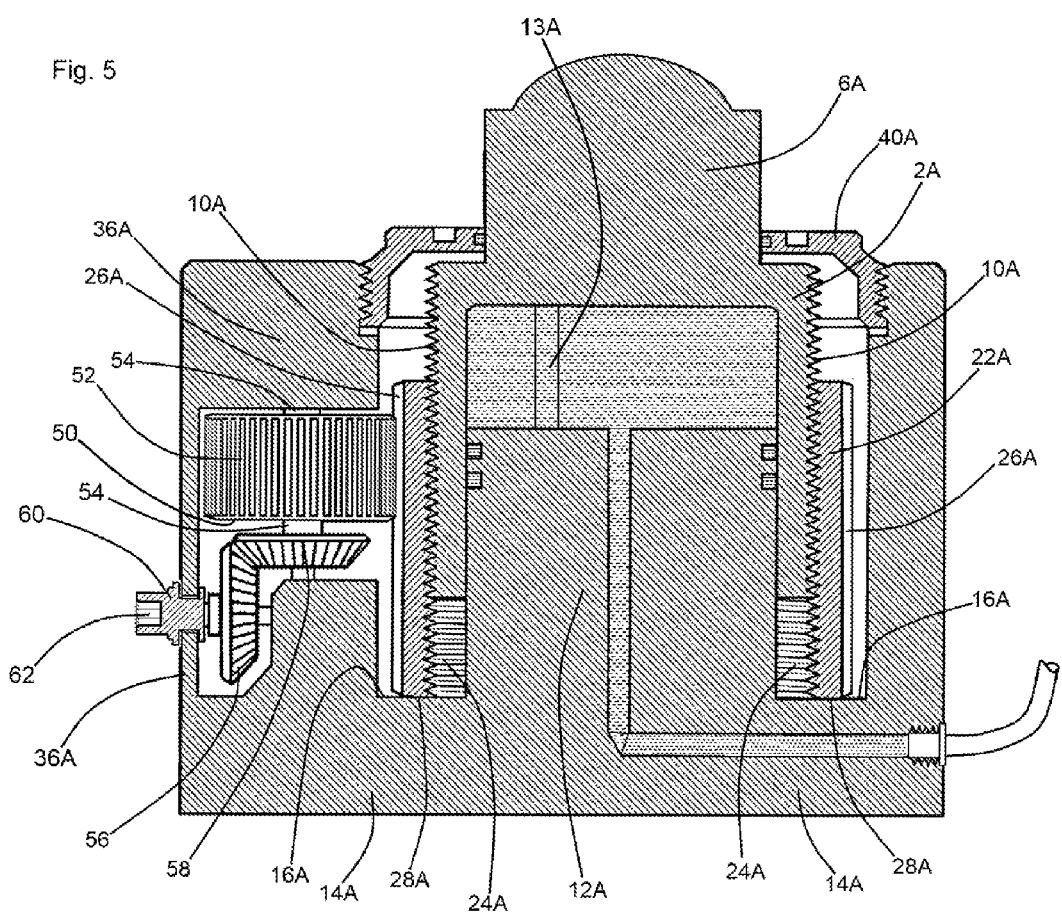

MACHINE LEVELING PEDESTAL

FIELD OF THE INVENTION

This invention relates to mechanical feet or pedestals utilized for supporting, leveling, and aligning items of precision heavy equipment and machinery. More particularly, this invention relates to such feet or pedestals which are adapted for hydraulic fluid actuated extension and retraction.

BACKGROUND OF THE INVENTION

Hydraulic fluid actuated equipment leveling pedestals, or cylinder pedestals, are known to be equipped and configured for performing a screw actuated "lockdown" function which alters the pedestal's mode of support from pressurized hydraulic fluid support to mechanical support. Such lockdown apparatus are often difficult to access for actuation and commonly become fouled by dust or debris.

The instant inventive machine leveling pedestal solves or ameliorates the problems, defects, and deficiencies noted above by providing a cylinder pedestal which is specially equipped with a motor (or other turning means) actuated locking nut, and is further equipped with a dust and debris shroud or shield.

BRIEF SUMMARY OF THE INVENTION

A first structural component of the instant inventive machine leveling pedestal comprises a cylinder and piston combination which defines an interior expansion space for receipt of and containment of the hydraulic fluid which drives the cylinder or piston. In a preferred embodiment, the cylinder and piston combination presents a helically threaded circumferential outer surface. While the helically threaded circumferential outer surface may suitably be located upon the piston component, such threads are, for purposes and considerations of space economy, preferably positioned upon and about the cylinder's outer surface. Such preferred location of the cylinder and piston combination's helical threads requires an upward orientation of the cylinder which opens downwardly for receipt of the piston. In such preferred embodiment, the upper cylinder head end of the cylinder forms an upwardly extending extension shaft whose upper end is adapted for bearing against a base or chassis support point of an item of heavy machinery. Also in such preferred cylinder and piston combination, the lower end of the piston component is configured for ground or floor contacting base support, such configuration preferably taking the form of a laterally extending base flange. Such laterally extending base flange may advantageously present and upwardly facing land at and about the lower end of the piston, the function of such land being further discussed below.

A further structural component of the instant inventive machine leveling pedestal comprises a hydraulic fluid passage port which opens the cylinder and piston combination's interior expansion space for hydraulic fluid injections and ejections. In a preferred embodiment, such port comprises a fluid passage channel which vertically traverses the piston, which laterally traverses the piston's lateral base flange. Such fluid passage port preferably outwardly communicates with a hydraulic fluid carrying line, and the opposite inner end of such port preferably opens at the piston's upper surface.

A further structural component of the instant inventive machine leveling pedestal comprises a nut having internal helically threads which are closely fitted for helically threaded mounting over the cylinder and piston combination's helical threads. In a preferred embodiment, the nut is vertically elongated and presents a multiplicity of vertically elongated gear teeth arranged in a radial array about the nut's circumferential outer surface. Also in the preferred embodiment, the nut presents a downwardly facing land.

Upon helically threaded mounting of the nut over the cylinder and piston combination, and upon turning of the nut, the nut may advantageously move downwardly to a mechanical support position wherein the nut's downwardly facing land contacts and rests upon the lateral flange's upwardly facing land. Alternatively, upon counter-rotating the nut, the nut may threadedly move upwardly away from such mechanical support position to an upwardly displaced hydraulic support position.

A further structural component of the instant inventive machine leveling pedestal comprises a drive gear and rotatable mounting means combination which is connected operatively to the cylinder and piston combination for vertically slidably engaging the drive gear with the nut's vertically elongated gear teeth, and for, upon alternate rotations and counter-rotations of the drive gear, upwardly and downwardly moving the nut between the mechanical support and hydraulic fluid support positions.

In a preferred embodiment, the drive gear comprises a worm gear and the rotatable mounting means comprise an axle which rotatably supports the drive gear. The rotatable mounting means preferably further comprise axle mounts which are formed integrally with a lateral wall which is fixedly attached to and extends upwardly from the pedestal's lateral flange.

Where the drive gear comprises a worm gear, the helical screw flight of the gear necessarily has a pitch angle which is substantially matched by an axle skew angle established by the axle's preferred mount upon the lateral wall. By matching the axle's skew angle with the worm gear's pitch angle, the portions of the worm gear's helical flight which contact the nut's vertical gear teeth are advantageously continuously vertically oriented. Such complimenting angular orientations of gear teeth allows the nut to travel upwardly and downwardly with respect to the drive gear while the drive gear's helical flight remains in vertical and nesting sliding contact with the nut's gear teeth. Accordingly, such complimenting gear teeth orientations advantageously allow the worm gear to rotate at a fixed elevation and at a fixed axial angle while rotatably engaging the vertically moveable nut.

Configuration of the drive gear as a worm gear is preferred because its rotational axis intersects the pedestal's side wall, allowing a direct installation of motorized gear turning means. The worm gear is further preferred because it effectively locks the nut against rotation in absence of the worm gear's rotation. A pinion gear having a vertical rotation axis may be alternatively utilized, provided that a beveled gear train is provided for laterally directing the rotational drive axis toward a side wall.

As indicated above, means for turning the drive gear are necessarily provided, such means preferably comprising a motor selected from the group consisting of electric motors, hydraulic motors, and pneumatic motors. Suitably, the turning means may alternatively comprise a manually turnable component such as a drive socket or a turn crank.

In a preferred embodiment of the instant inventive machine leveling pedestal a debris shield comprising a lateral wall preferably surrounds and protects the cylinder, piston, and nut components. Such debris shield may advantageously prevent dust and debris from fouling and jamming the moveable gear and nut components of the pedestal. In a preferred embodiment, the debris shield comprises a peripheral and preferably box configured lateral wall whose lower end is fixedly attached to the piston's lower lateral flange, and which is vertically co-extensive with the cylinder and pedestal. Provision of such preferred debris shield advantageously provides mounting structures for service as a component of the drive gear's rotatable mounting means. Outer surfaces of the preferred debris shield further advantageously function as mounting structures for support of the pedestal's turning means.

In order to provide further protection against debris fouling of internal mechanical components, the upper end of the peripheral debris shielding wall preferably forms a circular opening which is covered by a circular debris shielding cap. Preferably, such cap is secured in place via a helically threaded attachment, and such cap preferably has a circular central aperture for closely fitted and sliding receipt of and the cylinder's upper extension shaft.

In operation of the instant inventive machine leveling pedestal, the pedestal may be positioned beneath a machine, and may hydraulically support the machine at a desired elevation over a shop floor. In the event that an operator wishes to transfer the pedestal support of the machine from hydraulic fluid support to a direct mechanical mode of support, the operator may actuate the pedestal's turning means to simultaneously rotate the pedestal's drive gear and the nut. Provided that the nut is mounted over right-handed threads, clockwise turning of the nut may proceed until the nut's downwardly facing land contacts the upwardly facing land presented upon the upper surface of the piston's lateral flange. Upon such contact, hydraulic pressure may be relieved while the pedestal continues to maintain the desired elevated position via a substituted mechanical column of support including the lateral flange, the nut, and the cylinder.

Accordingly, objects of the instant invention include the provision of a machine leveling pedestal which incorporates structures as described above, and which arranges those structures in relation to each other in manners described above for achievement of the advantages and benefits described above.

Other and further objects, benefits, and advantages of the present invention will become known to those skilled in the art upon review of the Detailed Description which follows, and upon review of the appended drawings.

BRIEF DESCRIPTION OF THE DRAWINGS

FIG. 5 presents an alternate configuration of the structure depicted in FIG. 4.

DETAILED DESCRIPTION OF A PREFERRED EMBODIMENT

Figure 1:
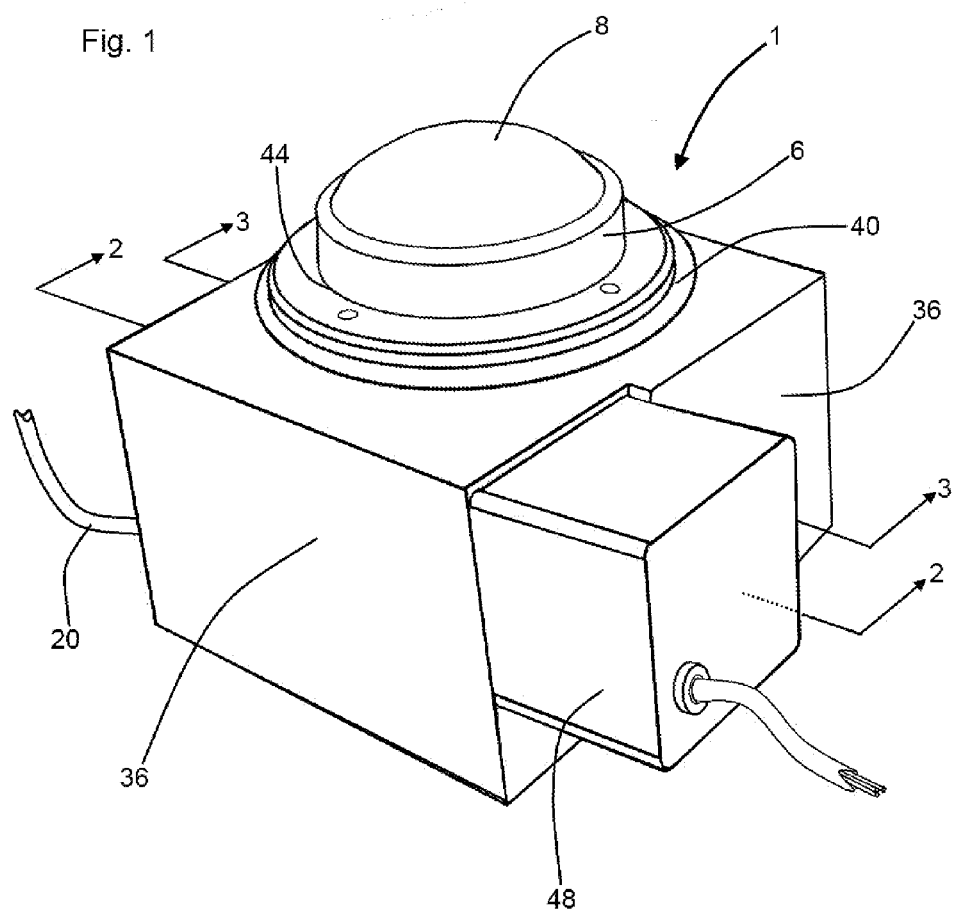
FIG. 1 is a perspective view of a preferred embodiment of the instant inventive machine leveling pedestal.
Figure 2:
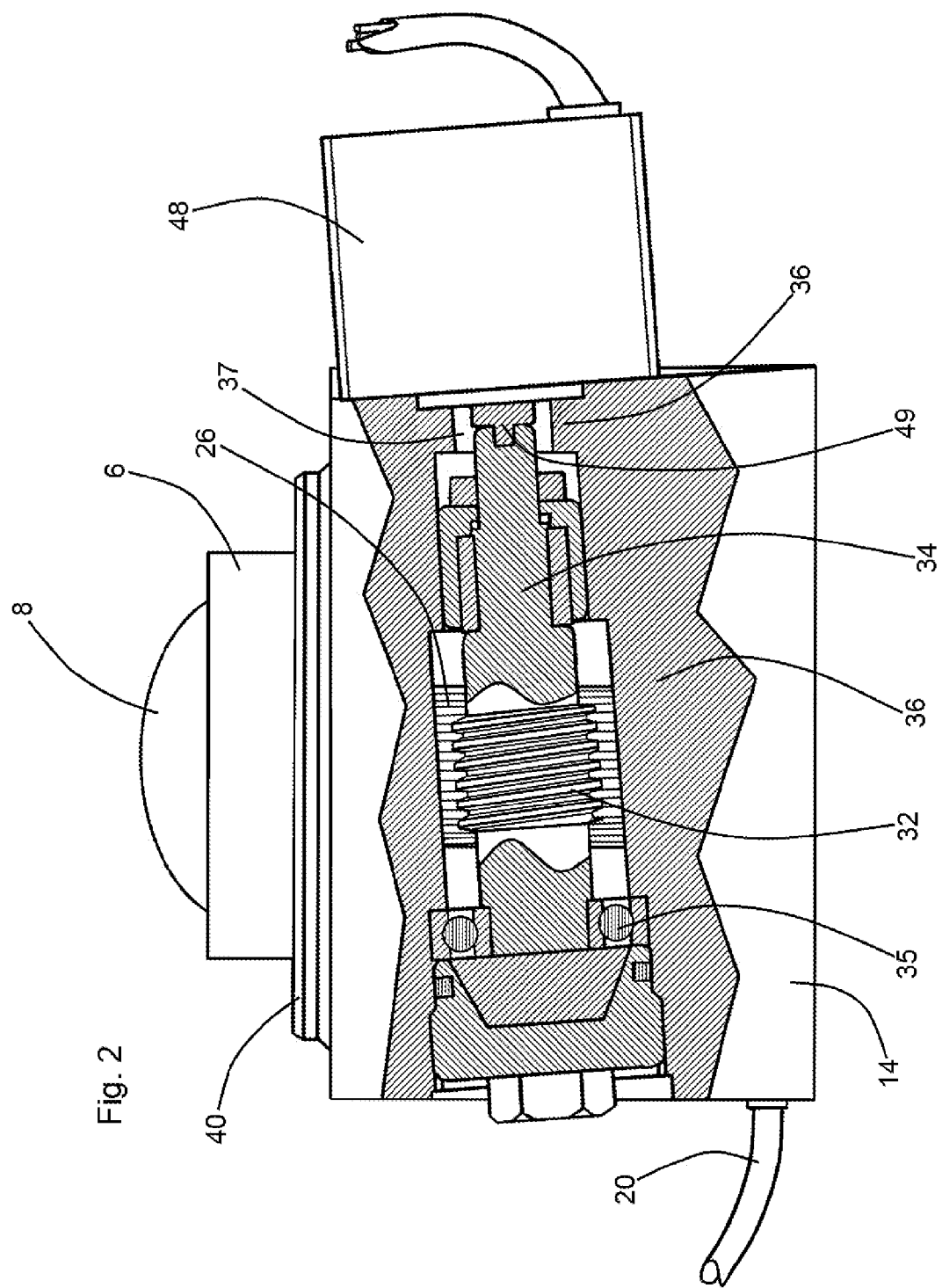
FIG. 2 is a sectional view as indicated in FIG. 1.
Figure 3:
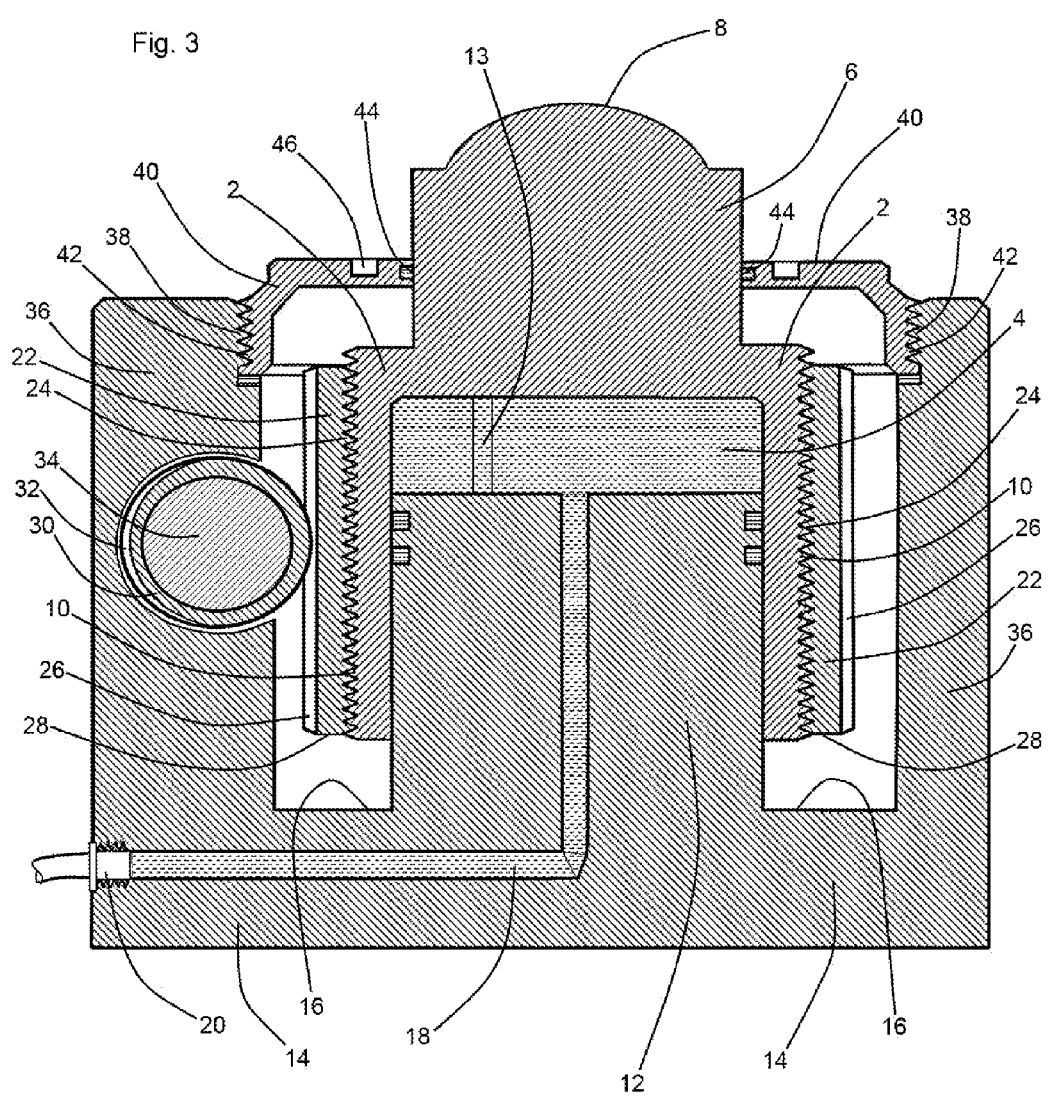
FIG. 3 is an alternative sectional view as indicated in FIG. 1.

Referring now to the drawings and in particular to Drawing FIG. 1, a preferred embodiment of the instant inventive machine leveling pedestal is referred to generally by Reference Arrow 1. Referring further simultaneously to FIGS. 2 and 3, the pedestal 1 preferably comprises a helically threaded cylinder and piston combination, the cylinder 2 of such combination preferably defining a downwardly opening interior volume 4. The cylinder 2 preferably has a cylindrical upper extension shaft 6 which is formed wholly with the cylinder's head or upper end. The upper end of the extension shaft 6 preferably forms a domed machine supporting contact point 8. Helical threads 10 are preferably disposed about the outer circumferential surface of the cylinder 2.

The piston 12 component of the pedestal's cylinder and piston combination is preferably slidably received within space 4, and the lower end of the piston 12 preferably forms a laterally extending or horizontally extending support flange 14. Upper surfaces 16 of the support flange 14 advantageously form an upwardly facing contact land about the lower end of piston 12. A hydraulic fluid passage port 18 preferably extends vertically through the piston 12 and extends laterally through lateral flange 14, such port 18 preferably upwardly opening at the upper end of piston 12 and opening laterally for communication with a pressurized hydraulic line 20. An anti-rotation pin 13 spans the volume 4 between the piston 12 and the cylinder 6.

Figure 4:
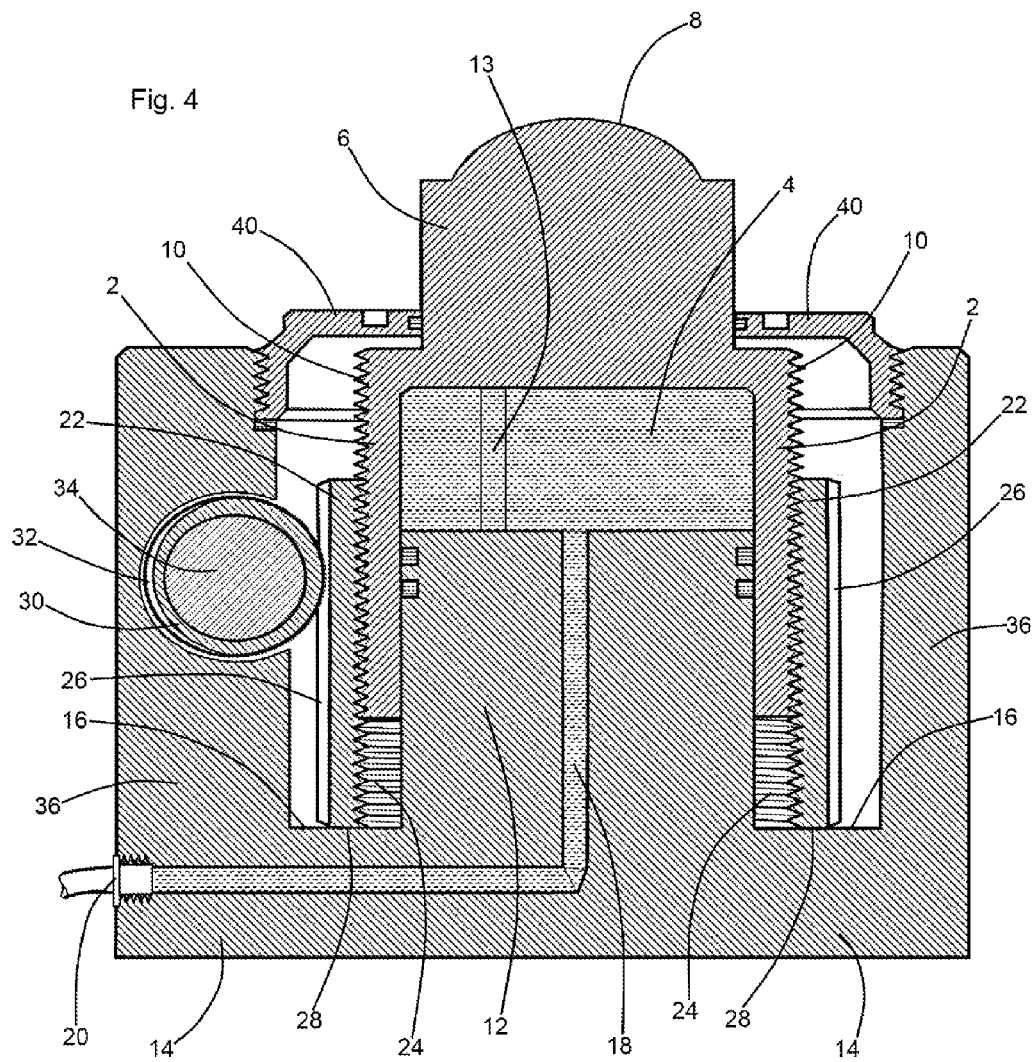
FIG. 4 redepicts the structure of FIG. 3, the view of FIG. 4 showing a cylinder and extension shaft upwardly extended, and showing the invention's specialized nut downwardly extended.

A nut 22 preferably has internal helical threads 24 which are closely fitted for threaded mounting over the cylinder's threads 10. A multitude of vertically elongated gear teeth 26 preferably extend radially outwardly from the nut 22, and the nut 22 preferably presents a downwardly facing contact land 28. Provided that helical threads 10 and 24 are right-handed, clockwise rotation of the nut 22 with respect to the cylinder 2 may advantageously downwardly move the nut 22 until the downwardly facing contact land 28 abuts the upwardly facing contact land 16, such contact being depicted in FIG. 4 and constituting a mechanical support position. Such abutting contact between lands 16 and 28 establishes a column of support from bearing surface 8 to the undersurface of lateral flange 14 which is independent of the hydraulic fluid. Accordingly, establishment of such mechanical support column allows hydraulic pressure to be relieved from space 4 without any vertical movement of cylinder 2 or extension shaft 6. Such substitute mechanical support column may more reliably retain a desired pedestal elevation during extended periods of time.

Referring simultaneously to FIGS. 2 and 3, a drive gear, preferably in the form of a worm gear 30 having a helical screw flight 32, is rotatably mounted with respect to the gear teeth 26 of the nut 22 so that rotations of the gear 30 may turn and counter-turn the nut 22. The drive gear's rotatable mounting means preferably comprise an axle 34, and in order to facilitate sliding vertical engagements between the nut's vertically elongated gear teeth 26 and the worm gear's screw flight 32, the axle 34 is preferably skewed at an angle which compliments the pitch angle of the worm gear's screw flight. The drive gear's rotatable mounting means preferably further comprise a lateral wall 36 which is fixedly attached to and extends upwardly from lateral flange 14. Such lateral wall 36 preferably extends completely peripherally about the cylinder 2, the nut 22, and the piston 12 in order to function as a debris shield which prevents dust and debris from fouling and jamming mechanical components housed therein.

Turning means such as an electric motor 48 are preferably mounted upon an outer surface of the debris shield wall 36, such means preferably having a rotary drive output 49 which extends inwardly through a wall aperture 37. The depicted electric motor 48 is intended as being representative of other motor means such as hydraulic motors and pneumatic motors. Alternatively, as indicated in FIG. 5, the turning means may suitably comprise a simple manually turnable element such as a rotatably mounted nut 60 having an outwardly exposed drive socket 62. Where the pedestal 1 resides at a remote recess beneath an item of machinery, such drive socket 62 may be accessed and turned through use of matching key (not depicted within views) having an extension handle or shaft.

The worm gear configuration of the drive gear is preferred because of its nut locking effect in absence of rotation of the worm gear. Notwithstanding, referring further to FIG. 5, the drive gear may alternatively comprise a pinion gear 50 having vertical gear teeth 52 which are fitted for engagement with the gear teeth 26A of nut 22A. Where such pinion gear is provided, the rotatable mounting means preferably comprise a vertical axle 54 in combination with debris shield outer wall 36A. Where such pinion gear is provided, the turning means may comprise a bevel gear train 56,58 which turns the gear's rotary drive axis 90° toward the pedestal's side wall. All structures identified in FIG. 5 having the suffix "A" are configured substantially identically with similarly numbered structures appearing in other figures.

Referring simultaneously to FIGS. 1 and 3, the debris shield of the instant inventive pedestal preferably further comprises a circular debris shrouding and protecting cap 40 which is preferably helically threadedly mounted at and within the preferably circularly formed upper opening of the debris shrouding wall 36. The debris shrouding cap 40 preferably has a central aperture 44 which is closely fitted for upward extension and sliding receipt of extension shaft 6. Turning of the cap 40 by engagement of a pin jaw wrench (not depicted within views) with wrench jaw sockets 46 may advantageously screw the cap 40 into place via the action of helical threads 38 and 42.

In operation of the instant inventive pedestal 1, referring simultaneously to FIGS. 1-4, the pedestal 1 may initially reside beneath a machine's support point with bearing surface 8 at the elevation depicted in FIG. 3. In the event an operator wishes to elevate such contact point, the operator may cause pressurized hydraulic fluid to be injected (typically through the use of a hydraulic pump) through coupling 20 into conduit port 18 for additional filling of interior cylinder space 4. Such injected hydraulic fluid may raise the extension shaft 6 and the bearing point 8 from the lower position depicted in FIG. 3 to the relatively high position depicted in FIG. 4. In the event that the FIG. 4 position is deemed to be correct, the operator may actuate the electric motor turning means 48 to turn axle 34 along with worm gear 30 clockwise, such turning motion simultaneously turning nut 22 clockwise via the engagement of screw flight 32 with gear teeth 26. Such drive gear impelled clockwise turning of nut 22 may continue until the nut's downwardly facing land 28 contacts the upwardly facing land 16 of the piston's lateral flange 14. During the downward travel of the nut 22 to such land-to-land contact position, the nut's vertically elongated gear teeth 26 move slidably and nestingly with respect to the rotating screw flight 32, and upon the contact of land 28 with land 16, a mechanical support configuration is established. Thereafter, hydraulic fluid pressure within space 4 may be relieved while the nut 22 serves as a support component in replacement of the hydraulic fluid. Reversal of steps described above may allow the cylinder 2 and the extension shaft 6 to be positioned and re-positioned at varying vertical elevations with alternative hydraulic and mechanical support being advantageously available at any selected elevation.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. A machine leveling pedestal comprising:
   (a) a cylinder and piston combination defining an interior expansion space, said combination having a helically threaded outer surface, and having an upwardly facing land;
   (b) a hydraulic fluid passage port opening the interior expansion space;
   (c) a nut having a downwardly facing land and having gear teeth, the nut being threadedly mounted over the cylinder and piston combination's helically threaded outer surface;
   (d) a drive gear and rotatable mounting means combination connected operatively to the cylinder and piston combination for vertically slidably engaging the drive gear with the nut's gear teeth, and for, upon alternate rotations and counter-rotations of the drive gear, alternately rotating and counter-rotating the nut about the cylinder and piston combination so that the nut may vertically move between a mechanical support position and a hydraulic support position, the upwardly and downwardly facing lands contacting each other upon the nut's movement to the mechanical support position, and the downwardly facing land displacing upwardly from the upwardly facing land upon the nut's movement toward the hydraulic support position; and
   (e) turning means connected operatively to the drive gear and rotatable mounting means; wherein the cylinder opens downwardly and has an upper end configured for machine support; wherein the cylinder and piston combination's piston has a lateral flange positioned at the piston's lower end, the upwardly facing land being positioned at said lateral flange; and
   (f) a debris shield, the debris shield comprising a lateral wall having a lower end, the lateral wall's lower end being fixedly attached to the lateral flange.

2. The machine leveling pedestal of claim 1 wherein the drive gear and rotatable mounting means comprise an axle connected operatively to the drive gear and the debris shield's lateral wall, the axle being mounted upon said wall.

3. The machine leveling pedestal of claim 2 wherein the drive gear comprises a worm gear whose screw flight has a pitch angle, wherein the axle is oriented at a skew angle with respect to the lateral wall, and wherein the worm gear's pitch angle is substantially equal to the axle's skew angle for facilitating the vertical sliding engagement of the drive gear with the nut's gear teeth.

4. The machine leveling pedestal of claim 2 wherein the drive gear comprises a pinion gear and wherein the turning means comprise a bevel gear train connected operatively to the axle.

5. The machine leveling pedestal of claim 2 wherein the drive gear comprises a worm gear or a pinion gear.

6. The machine leveling pedestal of claim 5 wherein the turning means comprise an electric motor having a rotary drive output, the electric motor being mounted upon an exterior surface of the debris shield's lateral wall, the electric motor's rotary drive output extending through said wall for operative engagement with the axle.

7. The machine leveling pedestal of claim 5 wherein the configuration of the cylinder's upper end for machine support comprises a cylindrical extension shaft, wherein the debris shield's lateral wall forms a circularly opening upper end, and further comprising a debris shielding cap covering said circularly opening upper end, the debris shielding cap having an extension shaft passage port closely fitted for slidably receiving the cylindrical extension shaft.

8. The machine leveling pedestal of claim 7 wherein the debris shielding cap is helically threadedly fastened at the lateral wall's circularly opening upper end.

9. The machine leveling pedestal of claim 8 wherein the hydraulic fluid port vertically traverses the piston and laterally traverses the piston's flanged lower end.

* * * * *